(12) United States Patent
Navarre et al.

(10) Patent No.: US 6,224,768 B1
(45) Date of Patent: *May 1, 2001

(54) FILTER PAPER FOR LADEN LIQUIDS

(75) Inventors: Francois-Pierre Navarre, Charbonniere les Bains; Bernard Bossand, Communay; Pierre Girard, Saint Ismier; Joseph Dussaud, Pont-Eveque, all of (FR)

(73) Assignees: Elf Antar France, Courvevoie; Ahlstrom, Vitry sur Seine, both of (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/988,066

(22) Filed: Dec. 10, 1997

(30) Foreign Application Priority Data

Dec. 12, 1996 (FR) .................................................. 96 15294

(51) Int. Cl.⁷ .................................................... B01D 39/18
(52) U.S. Cl. ....................... 210/502.1; 210/504; 210/505; 162/142; 162/161; 162/164.2; 162/181.5
(58) Field of Search .............................. 210/502.1, 503, 210/505, DIG. 5, DIG. 6, 504, 496, 508, 509, 501; 162/164.2, 181.9, 142, 150, 161, 176, 181.1, 181.3, 181.5

(56) References Cited

U.S. PATENT DOCUMENTS

| | | | | |
|---|---|---|---|---|
| 1,960,551 | * | 5/1934 | Richter | 162/176 |
| 2,955,067 | * | 10/1960 | McBurney | 210/505 |
| 4,305,782 | * | 12/1981 | Ostreicher et al. | 210/503 |
| 4,395,332 | | 7/1983 | Klein . | |
| 4,821,750 | * | 4/1989 | Browne | 131/345 |
| 5,030,284 | * | 7/1991 | Witham | 106/409 |
| 5,409,021 | * | 4/1995 | Safaev et al. | 131/344 |
| 5,554,288 | | 9/1996 | Rydell et al. . | |

FOREIGN PATENT DOCUMENTS

| | | | |
|---|---|---|---|
| 0 159 377 | 10/1985 | (EP) . | |
| 2 216 377 | 8/1974 | (FR) . | |
| 33170 | * 3/1977 | (JP) | 210/504 |
| 12573 | * 2/1978 | (JP) | 210/508 |
| 30575 | * 3/1979 | (JP) | 210/496 |
| 330908 | * 11/1992 | (JP) | 210/502.1 |

\* cited by examiner

*Primary Examiner*—Matthew O. Savage
(74) *Attorney, Agent, or Firm*—Oblon, Spivak, McClelland, Maier & Neustadt, P.C.

(57) ABSTRACT

The subject-matter of the present invention is a filter paper for laden liquids, with a high adsorption and absorption capacity. This paper, based on cellulose fibers, is filled with organic and/or inorganic pulverulent matter. The powder filling is adapted in quantity and quality to the liquid to be filtered. It finds its application in petrochemical, agri-foodstuffs and papermaking industries.

10 Claims, No Drawings

FILTER PAPER FOR LADEN LIQUIDS

TECHNICAL FIELD

The present invention relates to a paper for filtering laden liquids, with a high adsorption and absorption capacity, exhibiting a high porosity, based on natural and/or synthetic cellulose fibres additionally comprising pulverulent organic matter. It may also comprise inorganic pulverulent matter and bactericidal and/or viricidal agents.

It finds its application in the crude oil processing industries, the industries which employ lubricating oils or machining fluids, the papermaking industries, the agri-foodstuffs industries and, in general, all industries which produce suspensions or emulsions that are rich in fats or waxes. It also finds its application in the filtration of the aqueous effluents produced by households and communities.

STATE OF THE PRIOR ART

Papers based on synthetic or natural fibres, employed in numerous applications for filtering liquids, are well known. In the case of industrial applications they exhibit some disadvantages especially because of their low porosities which entail mediocre rates of filtration, expressed as volume of liquid treated per unit time and per unit area.

The papers have insignificant adsorption capacities and reactivity; they do not make it possible to bind products such as phenols even in very small quantities in the liquids which are treated.

The known papers are ineffective for filtering very stable suspensions whose stability is the result of the presence of surface-active agents, and have no deodorizing power.

In addition, they are unsuitable for the treatment of liquids at a temperature higher than 90° C.

It is also known to employ papers filled with talc or bentonite, which have a hydraulic capacity lower than that of unfilled paper.

DESCRIPTION OF THE INVENTION

The aim of the invention is precisely to remedy these disadvantages. To this end it provides a filter paper for liquids, with a high adsorption and absorption capacity and with high porosity, based on cellulose fibres additionally comprising at least one pulverulent organic matter in which at least 95% of the particles have a particle size of between 1 and 150 microns, in a proportion of between 5 and 75% of the weight of the paper including the said organic matter.

According to another characteristic of the invention the organic matter includes a micronized active carbon of particle size between 5 and 50 microns, in a proportion preferably of between 5 and 70% of the weight of the paper including the said organic matter.

According to another characteristic of the invention the active carbon consists of at least one micronized coke chosen from coal cokes, petroleum cokes and lignite cokes.

According to another characteristic of the invention the organic matter includes a micronized roasted wood of particle size between 50 and 150 microns.

According to another characteristic of the invention the organic matter includes a conifer powder.

According to another characteristic the paper of the invention additionally comprises at least one inorganic material in a proportion of 0.2 to 70% of the weight of the paper including the said organic matter and the said inorganic material.

According to another characteristic of the invention the inorganic material is a product derived from silica, in powder form.

According to another characteristic of the invention the inorganic material is a product derived from alumina, in powder form.

According to another characteristic of the invention the inorganic material is a pulverulent catalyst of particle size between 2 and 100 microns.

According to another characteristic the paper of the invention additionally comprises a pH-modifying agent.

According to another characteristic the paper of the invention additionally comprises a bactericidal agent.

According to another characteristic the paper of the invention additionally comprises a viricidal agent.

According to another characteristic the paper of the invention has undergone a treatment to make it oleophilic.

According to another characteristic the paper of the invention has undergone a treatment to make it water-repellent.

Other characteristics and advantages of the invention will be seen better on reading the detailed description and the examples which are to follow.

DETAILED DESCRIPTION OF THE INVENTION

The subject-matter of the invention is a filled filter paper produced from natural and/or artificial cellulose fibres to which organic matter in the form of powders is added to improve its hydraulic capacity without appreciably impairing the other characteristics.

This result is illustrated by the following table:

|  | Units | V1<br>WP = 100% | V2<br>WP = 80%<br>OF = 20% | V3<br>WP = 60%<br>OF = 40% |
| --- | --- | --- | --- | --- |
| Weight/unit area | g/m$^2$ | 267 | 276 | 277 |
| Thickness | μm | 373 | 481 | 528 |
| Hydraulic capacity | m$^3$/m$^2$/h | 0.9 | 5.6 | 7 |

In which:

V1, V2, V3 are three variants of paper composition.

WP means recovered wastepaper forming the cellulose fibres.

OF means organic filler; in this example spruce powder of particle size smaller than 150 microns.

The hydraulic capacity is the water flow rate in cubic metres per hour and per square metre of paper area, measured at 25° C.

To observe the effects of various fillers in powder form, five tests were performed, the results of which are as follows:

|  | Units | Test references | | | | |
| --- | --- | --- | --- | --- | --- | --- |
|  |  | E1<br>WP = 100%<br>OF = 0% | E2<br>WP = 80%<br>OF = 20% | E3<br>WP = 55%<br>OF = 20%<br>Talc = 25% | E4<br>WP = 55%<br>OF = 20%<br>Bentonite = 25% | E5<br>WP = 68.5%<br>OF = 20%<br>Coke = 11.5% |
| Hydraulic capacity | m³/m²/h | 0.9 | 4.5 | 3.7 | 2.1 | 7.5 |

In which:

E1, E2, E3, E4 and E5 are the references of the five tests.

WP means recovered wastepaper forming the cellulose fibres.

OF means organic filler; in this example spruce powder of particle size smaller than 150 microns.

The hydraulic capacity is the water flow rate in cubic metres per hour and per square metre of paper area, measured at 25° C.

On comparing the results of tests E1 and E2 it is found that the fact of filling the paper with an organic powder has the effect of increasing the hydraulic capacity of the paper.

The addition of talc or of bentonite, represented by tests E3 and E4, produces the opposite effect, that is to say that the hydraulic capacity decreases.

When the paper of test E2 is filled with coal coke which has a particle size smaller than 150 microns the hydraulic capacity changes from 4.5 to 7.5 m³/m²/hour. These results show that the paper of the invention is a filter material whose characteristics can be adapted to the liquid to be filtered by modifying its composition in quality and in quantity.

The paper of the invention can be employed as filter medium with known devices making use of known processes. As example there may be mentioned belt filters with paper unwinding, in which the solid matter in suspension in the liquid to be filtered is retained on the paper to form a cake, some products are adsorbed in the powder which fills the paper, and the filtrate consisting of the coalesced liquid components is collected.

The paper of the invention can also be used by means of known filters of the vacuum rotary type.

According to another characteristic of the invention the organic matter filler of the filter paper includes at least one active carbon of particle size between 5 and 50 microns.

By way of example there may be mentioned active carbons obtained in ovens from vegetable matter such as coconuts, olive stones and cork. These active carbons are micronized and preferably represent 5 to 70% of the weight of the cellulose fibres.

The small diameter of the pores of these materials, of the order of 25 Å, increases the adsorbency of the paper.

Paper filled with active carbon powder is particularly suited to the filtration of suspensions and lightly laden water. It has the advantage of retaining aromatic hydrocarbons, especially benzene, as well as the organic products of spent lyes, pesticides and detergent organochlorine products.

When a very high hydraulic capacity is required, then the organic matter employed for filling the paper fibres is micronized lignite or petroleum cokes in proportions of between 15 and 40% of the weight of paper. These cokes exhibit high specific surfaces of the order of 100 to 300 m²/g, which impart good adsorption capacities to the paper.

In addition the paper filled with active carbons exhibits a compressibility coefficient of the order of 0.3, which enables it to withstand large variations in pressure.

Other cokes can be employed advantageously because of their low cost; these are, for example, powdered cork burnt by forest fires.

Filter papers which have similar properties are obtained by being filled with roasted and micronized wood powders.

According to another characteristic of the invention the filter paper is filled with agents which modify its pH, for example alumina sulphate, sulphuric acid and ion exchange resins.

According to another characteristic of the invention inorganic pulverulent matter derived from silica, such as silicates, natural silica or crystalline silicoaluminates are added to the cellulose fibres for treating suspensions which require ion exchange capacities or high adsorption and absorption capacities.

According to another characteristic of the invention the paper is filled with catalytic cracker spent catalyst which exhibits a specific surface of 10 m²/g and a porosity of 0.5 cm³/g and the particle size characteristics of which are the following:

| Catalyst particle size in microns | Proportions in volume % |
| --- | --- |
| 0–40 | 10 |
| 40–80 | 55 |
| 80–105 | 20 |
| 105–150 | 10 |
| >150 | 5 |

An advantageous special feature of catalyst of this type is that it exhibits pores of mean radius of the order of 20 nanometres, which are real traps for molecules.

The filter paper filled with catalytic cracker catalyst also has the advantage of standing up well to processing temperatures of the order of 100° C., of being endowed with oleophilic properties which make it a good coalescer for oils and of having a good mechanical strength.

Another characteristic of the invention is that the filled paper can be treated in a known manner to make it oil-repellent, oleophilic or fire-resistant in order to adapt it to the suspension to be filtered.

Depending on the requirements, paper filled with powders may also comprise bactericidal and/or viricidal agents. These agents can be introduced during the manufacture of the paper or at the time of its use by adsorption of bactericidal products such as formalin and isotiasolidine or by chemical grafting.

EXAMPLE 1

The suspension treated is an oily suspension of petroleum origin which has been used for lubrication. It exhibits the following characteristics:

| | |
|---|---|
| oil content: | 96% |
| water content: | 0.2% |
| solids content: | 3.8% (3 to 100 μm) |
| colour: | black |
| viscosity: | 78 × 10$^{-6}$ m$^2$/s at 40% |
| relative density: | 0.893 |

The filter paper employed as filter medium in a vacuum filter has the following composition:

| | |
|---|---|
| recycled paper fibre | 50% |
| coniferous wood powder: | 30% |
| coal coke | 10% |
| cork powder | 3% |
| catalytic cracker catalyst | 7% |

The suspension to be treated is mixed with LCO (light cycle oil) originating from a catalytic cracker of a crude oil refinery, to dissolve the heavy hydrocarbons present in the suspension and to make it less viscous.

Under the effect of the vacuum the oil in the suspension passes through the powders filling the filter paper. The solid matter in suspension, which is particles of carbon or metal particles or degradation products of the oil and of its additives, remains on the paper and the powders become saturated with hydrocarbons.

The filtrate collected has the following properties:

| | |
|---|---|
| water content: | not measurable |
| solids content: | not measurable |
| relative density: | 0.9 |
| viscosity: | 23.6 × 10$^{-6}$ m$^2$/s at 40° C. |

This filtrate is stable and constitutes a good fuel for a diesel engine.

EXAMPLE 2

The suspension treated is a refinery oily suspension which exhibits the following characteristics:

| | |
|---|---|
| colour: | black |
| relative density: | 0.978 |
| viscosity: | 5 mPa s at 50° C. |
| solids content: | 6% |
| water content: | 54% |
| oil content: | 40% |

The filled paper consists of 70 weight % of recycled fibres and 30% of spruce powder containing 95% of particles smaller than 150 μm and 50% of sizes between 10 and 100 μm; its weight per unit area is 224 g/m$^2$ and its thickness is 400 μm.

The powder-filled paper is placed on a filter cloth made of polyamide called Rilsan® of 90 cm width, which unwinds in front of the vacuum boxes. Just before the presentation in front of these vacuum boxes a rack disperses a low-pressure steam condensate at 95° C. This action is intended to saturate the fibres with water and to facilitate the application of vacuum and the circulation of the liquid flows and to anticipate by the expansion of the powders which are intended to swell the fibres in the paper in order to increase its hydraulic capacity. A second rack throws forward a mixture of suspension with LCO at a temperature of 70° C.

Under the effect of pressure the suspension passes through the paper. The paper driven by the cloth passes over a first vacuum zone where the pressure is 266×10$^2$ Pa, then a second vacuum zone where the pressure is 200×10$^2$ Pa and finally a last vacuum zone where the pressure is only 80×10$^2$ Pa; in this last zone the colour of the deposited layer becomes grey. The deposit is drained of liquid and this explains the very low water content of the material at the end of treatment. The solid matter is deposited on the paper and becomes concentrated in step with the forward travel of the cloth towards a roller which winds up the paper filled with powder and with adsorbed and absorbed matter. The fraction of the liquid which passes through the filled paper is destabilized and separates out into a simple flask. The separated water phase contains 20 mg/kg of hydrocarbons and 15 mg/kg of matter in suspension. This water is sent to a conventional water treatment station. The decanted oil phase contains 0.8% by weight of water. This oil is suitable for being recycled into a crude oil processing unit or for being employed as a flux.

EXAMPLE 3

The suspension treated is an emulsion of waxes in water which has been used for machining metal components.

The filled filter paper includes the following components:

| | |
|---|---|
| recycled fibres | 50% |
| spruce powders | 30% |
| cork powders | 5% |
| coke powder | 15% |

The particle size of the spruce powders is between 10 and 150 microns. That of the cork powders is between 5 and 20 microns. That of the coke is between 100 and 150 microns.

This filled paper is employed as vacuum filter medium. The metal particles and a fraction of the surfactants and half the waxes in the emulsion remain bound onto the paper. The purified filtrate can be recycled or sent to a separator where water is separated from the wax.

The oil phase now contains only traces of particles and can therefore be recycled.

EXAMPLE 4

The suspension treated is an aqueous effluent from a meat-carving works, which is grey-coloured and nauseating in odour, with a high turbidity equal to 55,000 NTU, with pH equal to 5, a biochemical oxygen demand (BOD) equal to 49,400 mg per litre of oxygen, a chemical oxygen demand (COD) of 156,700 mg per litre of oxygen, and contains aerobic bacteria in a proportion of 3900 ml/l at 30° C. and anaerobic bacteria in a proportion of 60 ml/l at 30° C.

The paper consists of unrecycled fibres and of cellulose-rich powders. Its composition is the following:

| | |
|---|---|
| unrecycled cellulose fibres: | 70% |
| powdered corn cobs: | 25% |
| powdered olive stones: | 5% |

This paper is employed as filter medium in a vacuum rotary filter. The powder-filled paper becomes covered with a layer of grey-coloured fatty matter. Its composition is the following:

| | |
|---|---|
| water: | 30 weight % |
| fat: | 30% |
| proteins: | 20% |
| paper and powder: | 20% |

The filtered liquid is clear, its turbidity is reduced to 45 NTU, the BOD is 14,100 mg per litre of oxygen, the COD is 19,200 mg per litre of oxygen, the content of organic matter in suspension is 11 mg per litre, the content of aerobic bacteria at 30° C. is nil, as is the content of anaerobic bacteria at 30° C.

The mechanical strength of the paper is satisfactory with the vacuum rotary filter. The temperature of the suspension is available at 60° C. If the temperature remains higher than or equal to 60° C. during the separation, the proteins pass through the paper. The vacuum must be sufficient for the temperature on the paper to be between 50° C. and 55° C. Only in these conditions is the flow rate of filtrate of the order of 0.5 $m^3/m^2/h$.

What is claimed is:

1. Filter paper for liquids, with a high adsorption and absorption capacity and with high porosity, based on cellulose fibres, characterized in that it additionally comprises a conifer powder in which 95% of the particles have a particle size of between 1 and 150 microns, in a proportion of between 5 and 75% of the weight of the paper including the conifer powder.

2. Paper according to one of claim 1, characterized in that it additionally comprises at least one inorganic material in a proportion of 0.2 to 70% of the weight of the paper including the said organic matter and the said inorganic material.

3. Paper according to claim 2, characterized in that the inorganic material is a product derived from silica, in powder form.

4. Paper according to claim 2, characterized in that the inorganic material is a product derived from alumina, in powder form.

5. Paper according to claim 2, characterized in that the inorganic material is a pulverulent catalyst of particle size between 2 and 100 microns.

6. Paper according to one of claim 1, characterized in that it additionally comprises a pH-modifying agent.

7. Paper according to one of claim 1, characterized in that it additionally comprises a bactericidal agent.

8. Paper according to one of claim 1, characterized in that it additionally comprises a viricidal agent.

9. Paper according to one of claim 1, characterized in that the paper has undergone a treatment to make it oleophilic.

10. Paper according to one of claim 1, characterized in that the paper has undergone a treatment to make it water-repellent.

* * * * *

UNITED STATES PATENT AND TRADEMARK OFFICE
CERTIFICATE OF CORRECTION

PATENT NO. : 6,224,768 B1
DATED : May 1, 2001
INVENTOR(S) : Navarre et al.

It is certified that error appears in the above-identified patent and that said Letters Patent is hereby corrected as shown below:

<u>Title page,</u>
Item [73], the 1st Assignee's address is incorrect, item [73] should read as follows:

-- [73] Assignees: Elf Antar France, Courbevoie;
　　　　　　　　　Ahlstrom, Vitry sur Seine, both of (FR) --

Signed and Sealed this

Sixth Day of November, 2001

Attest:

*Nicholas P. Godici*

NICHOLAS P. GODICI
*Attesting Officer*　　*Acting Director of the United States Patent and Trademark Office*

UNITED STATES PATENT AND TRADEMARK OFFICE
CERTIFICATE OF CORRECTION

PATENT NO. : 6,224,768 B1
DATED : May 1, 2001
INVENTOR(S) : Navarre et al.

It is certified that error appears in the above-identified patent and that said Letters Patent is hereby corrected as shown below:

Title page,
Item [73], the 1st Assignee's address is incorrect, item [73] should read as follows:

-- [73] Assignees: Elf Antar France, Courbevoie;
                 Ahlstrom, Vitry sur Seine, both of (FR) --

Signed and Sealed this

Fourth Day of December, 2001

*Attest:*

*Attesting Officer*

NICHOLAS P. GODICI
*Acting Director of the United States Patent and Trademark Office*